(12) United States Patent
Pyun et al.

(10) Patent No.: US 12,552,903 B2
(45) Date of Patent: Feb. 17, 2026

(54) CHALCOGENIDE HYBRID ORGANIC/INORGANIC POLYMERS AND METHODS FOR PRODUCING AND USING THE SAME

(71) Applicant: Arizona Board of Regents on behalf of the University of Arizona, Tucson, AZ (US)

(72) Inventors: Dong-Chul ("Jeffrey") Pyun, Tucson, AZ (US); Robert A. Norwood, Tucson, AZ (US); Tristan Stephen Kleine, Tucson, AZ (US); Richard S. Glass, Tucson, AZ (US); Dennis L. Lichtenberger, Tucson, AZ (US); Meghan O'Brien Hamilton, Tucson, AZ (US); Nicholas Lyons, Tucson, AZ (US); Oliver Spires, Tucson, AZ (US); Laura E. Anderson, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 786 days.

(21) Appl. No.: 17/441,128

(22) PCT Filed: Mar. 20, 2020

(86) PCT No.: PCT/US2020/023978
§ 371 (c)(1),
(2) Date: Sep. 20, 2021

(87) PCT Pub. No.: WO2020/191340
PCT Pub. Date: Sep. 24, 2020

(65) Prior Publication Data
US 2022/0162390 A1    May 26, 2022

Related U.S. Application Data

(60) Provisional application No. 62/820,950, filed on Mar. 20, 2019.

(51) Int. Cl.
*C08G 75/16* (2006.01)
*C08G 75/14* (2006.01)
(Continued)

(52) U.S. Cl.
CPC ............. *C08G 75/16* (2013.01); *C08G 75/14* (2013.01); *C08G 79/00* (2013.01); *C08L 81/04* (2013.01); *G02B 1/04* (2013.01)

(58) Field of Classification Search
None
See application file for complete search history.

(56) References Cited

U.S. PATENT DOCUMENTS

| 4,190,460 A | * | 2/1980 | Cassar | .................... C04B 28/36 |
| | | | | 106/287.32 |
| 4,511,737 A | | 4/1985 | Budai et al. | |

(Continued)

FOREIGN PATENT DOCUMENTS

| WO | WO-9302121 A1 | * | 2/1993 | ............. C08G 61/08 |
| WO | WO-2017023045 A1 | * | 2/2017 | ............. C08F 132/00 |
| WO | WO-2018/183702 A1 | | 10/2018 | |

OTHER PUBLICATIONS

Liu et al (High refractive index polymers: fundamental research and practical applications, J. Mater. Chem., 2009, 19, 8907-8919) (Year: 2009).*

(Continued)

*Primary Examiner* — Rachel Kahn
(74) *Attorney, Agent, or Firm* — Foley & Lardner LLP

(57) ABSTRACT

The present invention provides chalcogenide hybrid organic/inorganic polymers ("CHIPs" or organic chalcogenide polymers) and methods for producing and using the same. In particular, the chalcogenide hybrid organic/inorganic polymers of the invention comprise a hydrocarbon cyclic ring structure and one or more chalcogenide selected from the group consisting of sulfur, selenium, cyclic selenium sulfide, and a combination thereof.

17 Claims, 3 Drawing Sheets

Poly(S₇₀-Norbornadiene Dimer₃₀) = Poly(S₇₀-NBDD₃₀)

(51) Int. Cl.
    *C08G 79/00*     (2006.01)
    *C08L 81/04*     (2006.01)
    *G02B 1/04*     (2006.01)

(56) References Cited

U.S. PATENT DOCUMENTS

| | | | |
|---|---|---|---|
| 4,754,028 A | 6/1988 | Dirlikov | |
| 4,877,820 A * | 10/1989 | Cowan | C08K 5/01 524/588 |
| 2003/0083445 A1 * | 5/2003 | Grubbs | B01J 31/2404 548/300.1 |
| 2008/0146759 A1 * | 6/2008 | Takashima | C08G 75/28 528/360 |
| 2018/0223034 A1 * | 8/2018 | Char | C08G 75/14 |

OTHER PUBLICATIONS

International Search Report and Written Opinion for International Application No. PCT/US2020/023978, dated Jul. 16, 2020, 10 pages.

Pubchem. CID 15506619. Feb. 10, 2007, pp. 1-8. Retrieved from the Internet <URL: https://pubchem.ncbi.nlm.nih.gov/compound/15506619>; p. 2, formula.

Wu, X et al.; 'Catalytic inverse vulcanization'; Feb. 7, 2019, Nature Communications; vol. 10, Article 647, pp. 1-9; p. 3, figure 1.

* cited by examiner

**Poly(S₇₀-Norbornadiene Dimer₃₀) =
Poly(S₇₀-NBDD₃₀)**

CHALCOGENIDE HYBRID ORGANIC/INORGANIC POLYMERS AND METHODS FOR PRODUCING AND USING THE SAME

CROSS-REFERENCE TO RELATED APPLICATIONS

This application is a 35 U.S.C. § 371 U.S. National Stage Application of PCT Patent Application No. PCT/US20/23978, filed Mar. 20, 2020, which claims the priority benefit of U.S. Provisional Patent Application No. 62/820,950, filed Mar. 20, 2019, all of which are incorporated herein by reference in their entirety.

FIELD OF THE INVENTION

The present invention relates to chalcogenide hybrid organic/inorganic polymers ("CHIPs" or organic chalcogenide polymers) and methods for producing and using the same. In particular, the chalcogenide hybrid organic/inorganic polymers of the invention comprise a hydrocarbon cyclic ring structure and one or more chalcogenide selected from the group consisting of sulfur, selenium, cyclic selenium sulfide, and a combination thereof.

BACKGROUND OF THE INVENTION

Currently, inorganic materials such as, chalcogenide glasses, or germanium are the only imaging materials used for 8-12 micron infrared ("IR") thermal imaging. However, these materials are very expensive and difficult to process, making the IR imaging systems too expensive. While extensive research has been devoted to producing IR imaging suitable polymers, to date no polymers have been developed that can meet the requirements of both thermomechanical properties and enhanced optical properties. For example, some chalcogenide hybrid organic/inorganic polymers that have been developed do not have the desired IR transparency properties or thermomechanical properties for fabrication into a suitable IR imaging system. In particular, most polymers containing organic compounds have very poor IR, especially LWIR, transparency required for use in IR thermal imaging system. As an example, as shown in FIGS. 1 and 2, diisopropenylbenzene ("DIB") and DIB with 80% sulfur chalcogenide ("80-wt % $S_8$") have a very poor IR transparency. Without being bound by any theory, it is believed that this is due at least in part to a strong IR absorption due to C—H vibrational modes. While other have used aromatic compounds and chalcogenide hydrid with aromatic compounds, aromatic compounds such as poly carbonate aromatic compounds also have a strong absorption, especially in the LWIR region, leading to opaque and unusable materials.

Currently, one of the main problems associate with or IR thermal imaging systems, in particular LWIR thermal imaging systems, is the availability of economical and readily mass-manufactured transmissive materials required for lens and windows (e.g., for automobiles and other applications). Current state-of-the-art transmissive materials for both mid-range wave infrared (MWIR) and long wave infrared (LWIR) thermal imaging include chalcogenide glasses and amorphous germanium semiconductors. While these and associated materials exhibit excellent optical properties for IR imaging, they are also generally dense, expensive, toxic, and difficult to process, which ultimately limits the applications of final IR imaging systems.

Therefore, there is a need for IR transmissive materials, in particular LWIR transmissive materials, to create lighter device components (e.g., lens, windows) suitable for mass production of IR imaging systems. There is also a need for IR transmissive materials that can be fabricated into a wide variety of forms, such as, optically flat windows, curved lenses, Fresnel lenses and any other arbitrary optical components.

SUMMARY OF THE INVENTION

Some aspects of the invention provides a chalcogenide hybrid organic/inorganic polymer comprising a non-aromatic hydrocarbon cyclic ring structure attached to a chalcogenide, wherein said chalcogenide hybrid organic/inorganic polymer has at least 5% transmission in the long wave infrared (LWIR) region ranging from about 8 μm to about 12 μm in wavelength (λ), and wherein said chalcogenide is selected from the group consisting of sulfur, selenium, cyclic selenium sulfide, and a combination thereof.

In some embodiments, said chalcogenide hybrid organic/inorganic polymer has refractive index of at least about 1.78 in the LWIR. Still in other embodiments, the total amount of chalcogenide in said polymer ranges from about 5 wt % to about 95 wt %.

Yet in other embodiments, said non-aromatic hydrocarbon cyclic ring structure comprises a monomer or a dimer of a compound of the formula:

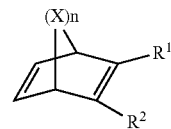

wherein, X is O, S, —$SO_2$—, —SO—, or $CH_2$; n is 1 when X is O and n is 1 or 2 when X is $CH_2$; and each of $R^1$ and $R^2$ is independently H, an ester (—C(=O)—$OR^a$, where $R^a$ is $C_{1-12}$ alkyl), cyano (—CN), nitro (—$NO_2$), halide (e.g., chloro, fluoro, bromo, and iodo), an amide (—C(=O)—$NR^aR^b$, where each of $R^a$ and $R^b$ is independently H or $C_{1-12}$ alkyl), a sulfoxide, or a sulfone.

In one particular embodiment, said non-aromatic hydrocarbon cyclic ring structure comprises bicyclo[2.2.1]heptane, bicyclo[2.2.2]octane, or a derivative thereof, or a mixture thereof. In another particular embodiment, said non-aromatic hydrocarbon cyclic ring structure comprises a dimer of bicyclo[2.2.1]heptane, a dimer of bicyclo[2.2.2]octane moiety, or a derivative thereof, or a mixture thereof.

In further embodiments, said chalcogenide hybrid organic/inorganic polymer is thermally stable at a temperature of at least about 220° C. under standard conditions (e.g., at one atmospheric pressure).

Still in other embodiments, said non-aromatic hydrocarbon cyclic ring structure comprises a functional group selected from the group consisting of a carbonyl, an ester, cyano, nitro, halide, an amide, sulfoxide, thioether, or ether.

Yet in other embodiments, said non-aromatic hydrocarbon cyclic ring structure is derived from a cycloaddition reaction of a starting material comprising cyclopentadiene, norbornadiene, benzoquinone, a cyclooctadiene, a cyclooctatriene, cyclooctatetraene, dicyclopentadiene or other $C_{6-20}$ cycloalkenes having two or more carbon-carbon unsaturated bonds. In some embodiments, said cycloaddition reaction comprises [4+2] cycloaddition reaction, [2+2] cycloaddition, or a combination thereof.

Another aspect of the invention provides a method for producing a chalcogenide hybrid organic/inorganic polymer comprising reacting an organic compound with a chalcogenide to produce said chalcogenide hybrid organic/inorganic polymer, wherein said chalcogenide is selected from the group consisting of sulfur, selenium, cyclic selenium sulfide, and a combination thereof, and wherein said organic compound is a non-aromatic compound comprising at least one hydrocarbon cyclic ring structure and at least one carbon-carbon unsaturated bond. The chalcogenide hybrid organic/inorganic polymer produced by methods of the invention has at least 5% transmission in the long wave infrared region (LWIR) ranging from about 8 μm to about 12 μm in wavelength (λ).

In some embodiments, the amount of chalcogenide present in said chalcogenide hybrid organic/inorganic polymer is at least about 5 wt %.

Yet in other embodiments, said organic compound has no conjugated carbon-carbon unsaturated bond.

Still in other embodiments, said organic compound is produced from a cycloaddition reaction of a starting material comprising cyclopentadiene, norbornadiene, benzoquinone, cyclooctadiene, cyclooctatriene, cyclooctatetraene, or dicyclopentadiene. In one particular embodiment, said cycloaddition reaction is selected from the group consisting of [4+2] cycloaddition, [2+2] cycloaddition, and a combination thereof.

In further embodiments, said starting material comprises a functional group selected from the group consisting of a carbonyl, an ester, cyano, nitro, halide, an amide, sulfoxide, thioether, and an ether.

In one particular embodiments, said starting material comprises cyclopentadiene or a cycloaddition product of cyclopentadiene or a derivative thereof, such as a dimer resulting from a [2+2] cycloaddition.

Yet in other embodiments, said organic compound comprises a dimer of norbornadiene, a trimer of norbornadiene, or a mixture thereof.

In further embodiments, said non-aromatic hydrocarbon cyclic ring structure is a moiety of the formula:

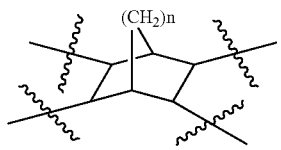

wherein n is 1 or 2.

Yet other aspects of the invention provides an infrared (IR) imaging or sensing device comprising a chalcogenide hybrid organic/inorganic polymer comprising a non-aromatic hydrocarbon cyclic ring structure attached to a chalcogenide and having at least 5% transmission in the long wave infrared (LWIR) region ranging from about 8 μm to about 12 μm in wavelength (λ), wherein said chalcogenide is selected from the group consisting of sulfur, selenium, cyclic selenium sulfide, and a combination thereof.

Still in some embodiments, said IR imaging or sensing device is adapted to image or sense in the long wave infrared (LWIR) region ranging from about 8 μm to about 12 μm in wavelength (λ).

In other embodiments, said chalcogenide hybrid organic/inorganic polymer is thermally stable at a temperature of at least about 220° C.

Further aspects of the invention provide a long wave infrared (LWIR) optical device comprising an optical substrate having a refractive index of at least about 1.65 (typically at least about 1.7) and at least 5% transmission in the long wave infrared (LWIR) region ranging from about 500 nm to about 12 μm in wavelength (λ), and wherein said optical substrate comprises a chalcogenide hybrid organic/inorganic polymer comprising a non-aromatic hydrocarbon cyclic ring structure attached to a chalcogenide selected from the group consisting of sulfur, selenium, cyclic selenium sulfide, and a combination thereof.

In some embodiments, said chalcogenide is sulfur.

Yet in other embodiments, said optical substrate has a refractive index ranging from about 1.7 to about 2.

Still in other embodiments, said optical substrate has a substantially transparent optical body in the visible and infrared spectrum. In some embodiments, the optical substrate has at least 10% transmission in the visible wave range (e.g., 400 to 700 nm), typically at least about 25% transmission, and often at least about 50% transmission.

In further embodiments, said optical substrate has at least about 5% transmission in the long wave infrared (LWIR) region ranging from about 8 μm to about 12 μm in wavelength (λ).

Still other aspects of the invention provide a method of preparing a chalcogenide hybrid organic/inorganic polymer optical lens that is substantially transparent in an infrared or visible spectrum, said method comprising:
(i) admixing a molten chalcogenide with an organic compound under conditions sufficient to produce a chalcogenide hybrid organic/inorganic polymer, wherein said chalcogenide is selected from the group consisting of sulfur, selenium, cyclic selenium sulfide, and a combination thereof; and
(ii) producing said chalcogenide hybrid organic/inorganic polymer optical lens from said chalcogenide hybrid organic/inorganic polymer,
wherein said chalcogenide hybrid organic/inorganic polymer optical lens has a refractive index of at least about 1.65 (typically at least about 1.7) and is substantially transparent in an infrared or visible spectrum.

In some embodiments, said chalcogenide is sulfur.

In one particular embodiment, said step (ii) of producing said CHIP optical lens comprises a diamond tuning fabrication method.

Yet further aspects of the invention provide a chalcogenide inorganic/organic polymer obtained from a process comprising heating a mixture of a chalcogenide and a non-aromatic hydrocarbon cyclic ring compound comprising at least one unsaturated bond to produce said chalcogenide inorganic/organic polymer, wherein the amount of said chalcogenide ranges from at least about 10% to at least about 95% by weight, typically from at least about 50% to at least about 90% by weight, and often from about 70% to about 90% by weight.

In some embodiments, said non-aromatic hydrocarbon cyclic ring compound comprises norborane ring structure.

Still in other embodiments, said non-aromatic hydrocarbon cyclic ring compound comprises a norbornadiene dimer ring structure.

DETAILED DESCRIPTION OF THE INVENTION

Figure 1:
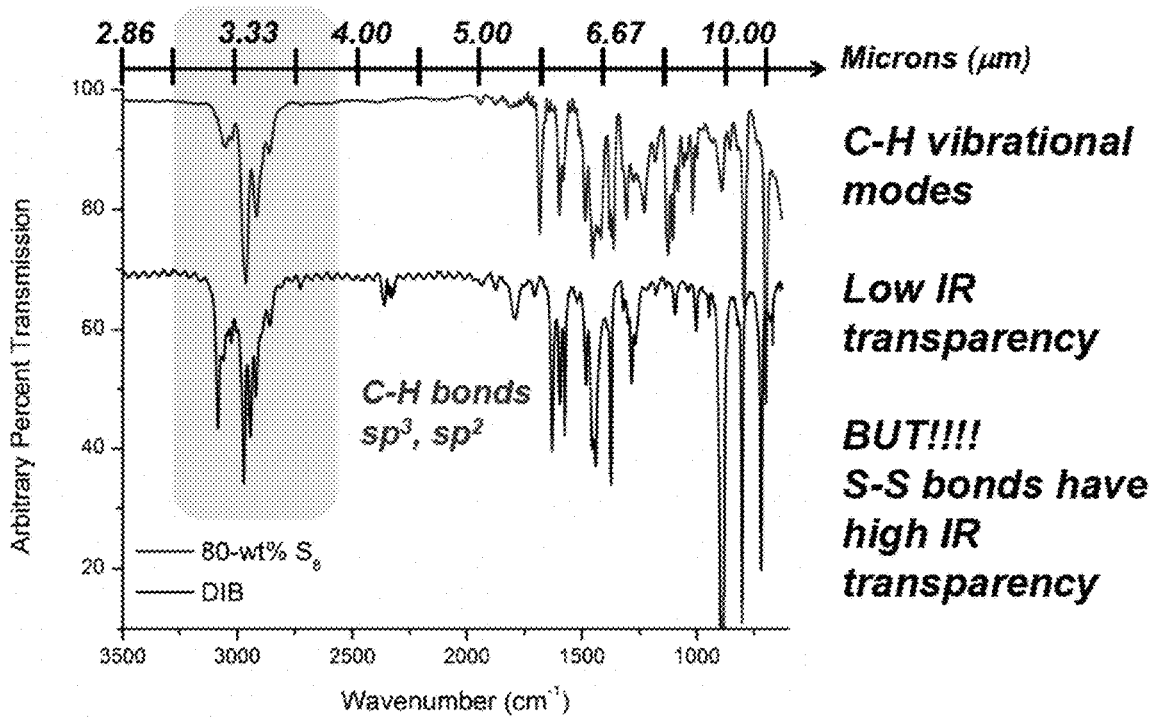
FIG. 1 shows the IR spectrum of polymeric materials comprised of diisopropenylbenzene ("DIB") and DIB with 80% sulfur chalcogenide ("80-wt % S$_8$") and problems associated in using these materials in IR optics.

There has been a tremendous research into the creation and implementation of inexpensive infrared (IR) thermal imaging systems for various applications including integrated IR optics, IR imaging for medical devices, law enforcement, security, firefighting, automotive night vision, process control, building inspection, etc. On the consumer front, IR imaging systems are being used in both luxury and economy automobiles. To date, long wave IR (i.e., 8-12 μm in wavelength (λ)) camera systems have been installed into several high-end luxury automobiles. However, long wave IR camera systems currently face technical and cost related challenges for use in higher volume, economical automobile models as they rely on expensive optical materials, such as germanium, that must be manually cut and carefully polished.

Most conventional organic polymers absorb infrared (IR) waves in the mid-IR and the long wave IR (LWIR). Without being bound by any theory, it is believed this IR opacity is due to the chemical composition and types of chemical bonds present in the vast majority of conventional organic polymers. Unless the context requires otherwise, the terms "organic polymer" and "polymer" are used interchangeably herein and refer to a plastic or a polymer that has large molecules made up of many relatively simple repeated units and include a series or plurality of small basic units (monomers) comprising hydrogen and carbon, which optionally may also include functional groups or heteroatom linkers, such as oxygen, nitrogen, sulfur and the like. There can be between hundreds and hundreds of thousands of basic units or monomers in a polymer.

The present invention overcomes many of the problems associated with conventional organic polymers that can be used in IR imaging systems.

In one aspect of the invention, chalcogenide hybrid organic/inorganic polymers ("CHIPs") that are IR transmissive, in particular LWIR transmissive, are provided. Such CHIPS of the invention can be used to create lighter device components (e.g., lens, windows) suitable for mass production of IR imaging systems, in particular LWIR imaging systems. The term "chalcogenide" refers to a compound or a polymer containing one or more chalcogen elements, i.e., group 16 elements, in particular sulfur, selenium, tellurium, or a mixture thereof. One of ordinary skill in the art will readily recognize that the classical chalcogen elements are those in Group 16 of the periodic table including sulfur, selenium and tellurium. In some embodiments, the chalcogenide hybrid organic/inorganic polymer ("CHIP") of the invention comprises a chalcogenide selected from the group consisting of sulfur, selenium, cyclic selenium sulfide, and a combination thereof.

In contrast to the commonly assigned U.S. Provisional Patent Application No. 62/740,392, filed Oct. 2, 2018, which comprises heteroaromatic compounds such as triazine and phosphazene moieties, chalcogenide hybrid organic/inorganic polymers of the present invention comprise a non-aromatic hydrocarbon cyclic ring structure. Moreover, in contrast to other chalcogenide hybrid organic/inorganic polymers ("CHIPs"), the amount of unsaturated bond remaining in the CHIPs of the invention are minimized to reduce absorption of infrared radiation. Thus, in some embodiment chalcogenide hybrid organic/inorganic polymers of the invention have less than about 5% by wt., typically less than about 2% by wt., often less than about 1% by wt., more often less than about 0.1% by wt., still more often less than about 0.01% by wt., and most often less than about 0.001% by wt. of unsaturated carbon-carbon bonds relative to the total amount of the non-aromatic hydrocarbon cyclic compound present in the CHIPs of the invention. It should be noted that some minor unsaturated carbon-carbon bonds or conjugated unsaturated bonds may be present in CHIPs as impurities, e.g., due to an incomplete polymerization. As used herein, the term "conjugated unsaturated bond" refers to connected p orbitals with delocalized electrons in a molecule. Exemplary conjugated unsaturated bonds include, but are not limited to, 1,3-diene compounds, α,β-unsaturated carbonyl compounds, and aromatic or heteroaromatic compounds, such as phenyl, anthracene, triazine, phosphazene, pyridine, etc. Still in other embodiments, the amount of non-aromatic hydrocarbon cyclic compounds used in preparation of CHIPs of the invention ranges from about 5 to about 90% by weight, typically about 50% or less, often from about 10 to about 50% by weight, and most often from about 10 to about 30% by weight.

In some embodiments, chalcogenide hybrid organic/inorganic polymers of the invention comprise no conjugated carbon-carbon unsaturated bond. It should be appreciated that the term "no conjugated carbon-carbon unsaturated bond" depends on the analytical system used to determine the presence of any carbon-carbon unsaturated bond. One skilled in the art is well aware of suitable analytical systems that can be used to determine the presence of carbon-carbon double bond. For example, the presence (or the absence) of a carbon-carbon double bond can be readily determined by examining the polymer's infrared (IR) spectrum, nuclear magnetic resonance (NMR) spectrum (such as $^1$H-NMR and $^{13}$C NMR), etc. Accordingly, in some embodiments, the term "no conjugated carbon-carbon unsaturated bond" is present means that there are no discernable peaks associated with a carbon-carbon double bond in the polymer's IR or NMR spectrum.

Figure 2:
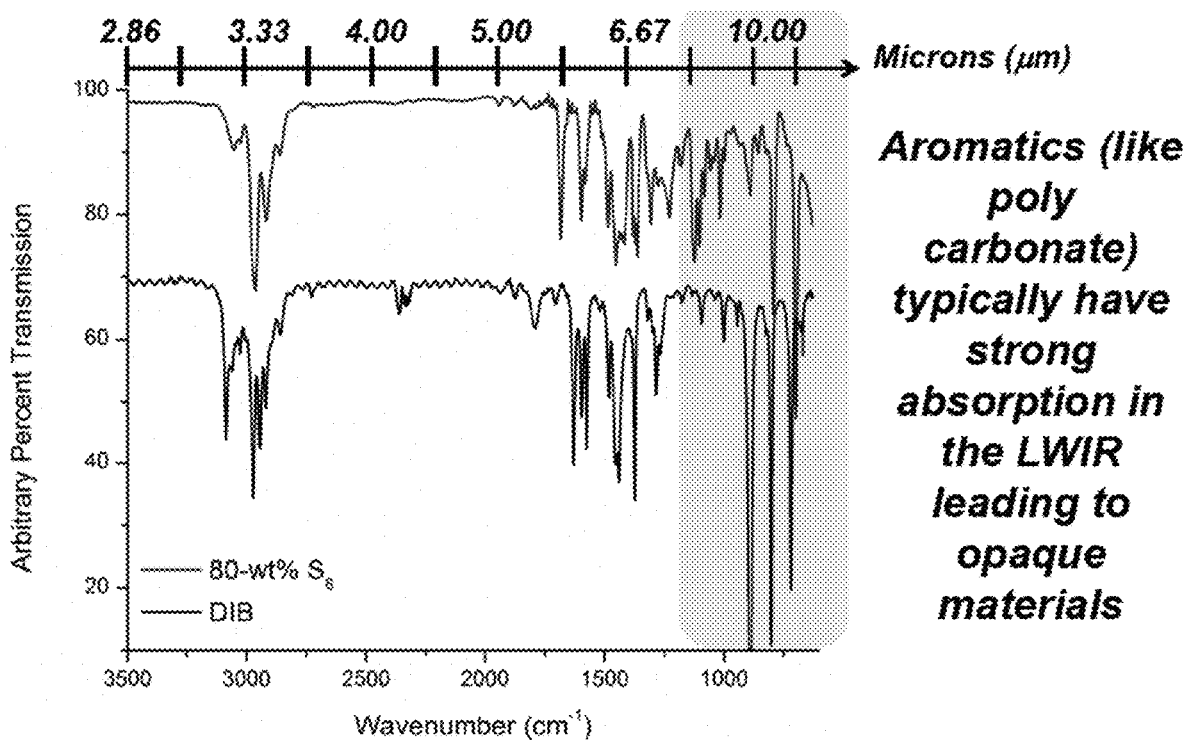
FIG. 2 shows IR spectrums of DIB and 80-wt % S$_8$-DIB chalcogenide hybrid organic/inorganic polymer in long wave IR optics and problems associated in using these materials in long wave IR optics.

As shown in the shaded area in FIG. 1, C—H vibrational modes strongly absorb the mid-IR waves (e.g., wavelength, λ, between about 3 μm to about 5 μm). Furthermore, as shown in the shaded area in FIG. 2, aromatic systems absorb strongly in wavelength, λ, from about 5 μm to about 12 μm. In contrast, bonds in chalcogenide (e.g., sulfur-sulfur bond) have high transparency in the IR region. The present inventors have discovered that eliminating an aromatic ring system and adding chalcogenide significantly increases both mid-IR and LWIR transparency of the chalcogenide hybrid organic/inorganic polymers of the present invention.

Figure 5A:
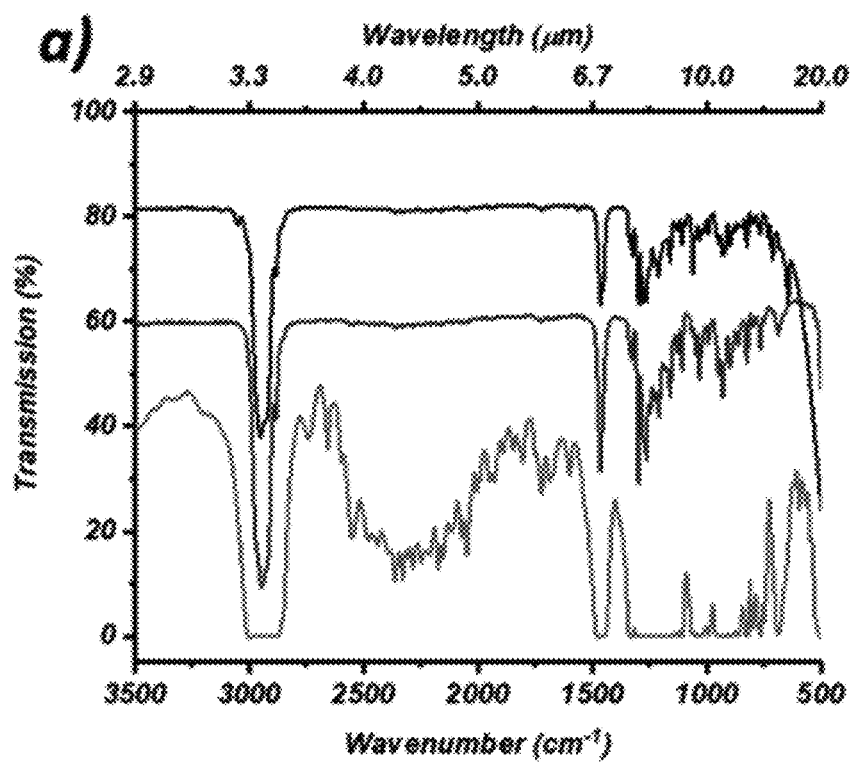
FIG. 5A shows stacked FTIR spectra of poly(S70-NBD230) at varying thicknesses from ~5-30 μm on a NaCl plate, 60 μm and 1 mm free standing films.
Figure 5B:
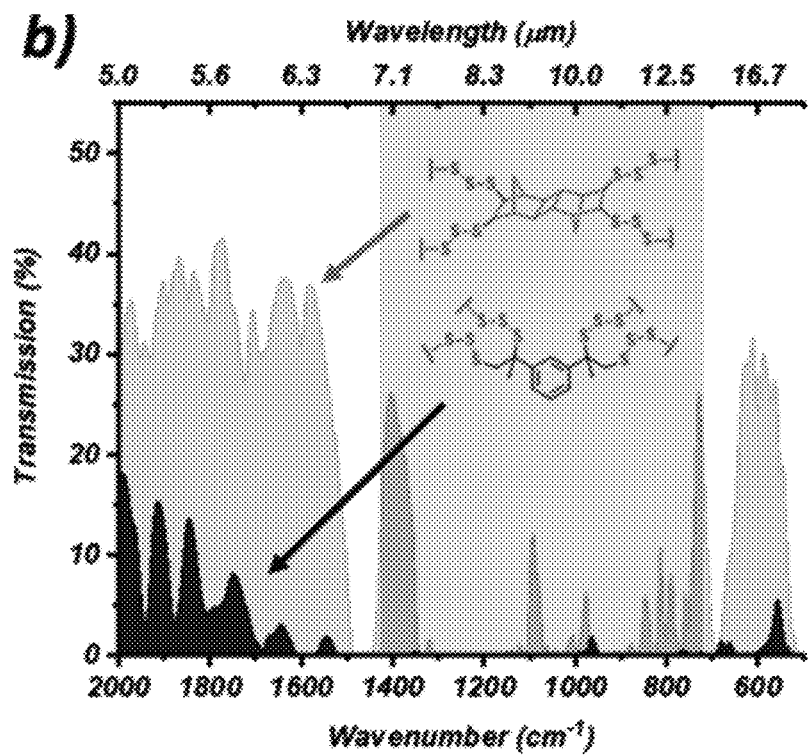
FIG. 5B shows expanded region of the mid-long wave IR spectrum of 1 mm thick films of poly(S70-NBD230) and poly(S70-DIB30) with the 7-14 μm regime shaded.

In some embodiments, the transparency at mid-IR wavelength of the chalcogenide hybrid organic/inorganic polymers of the invention is at least about 5%, typically at least about 10%, often at least about 15%, and more often at least about 20%. Alternatively, the mid-IR cutoff wavelength of the chalcogenide hybrid organic/inorganic polymers of the present invention is increased by at least about 5%, typically at least about 10%, often at least about 15%, and more often at least about 20% compared to the same or similar polymers in the absence of any chalcogenide. It should be appreciated that the transparency depends on the particular wavelength being used. The term "% transparency" as used herein means that the chalcogenide hybrid organic/inorganic polymer has the described transparency within at least a portion of the wavelength specified, e.g., within mid-IR or LWIR wavelength as illustrated in FIGS. 5A and 5B.

In other embodiments, the transparency in the LWIR wavelength region (e.g., λ of from about 5 µm to about 12 µm) of the chalcogenide hybrid organic/inorganic polymers of the present invention is at least about 1%, typically at least about 5%, often at least about 10%, and more often at least about 15%. Alternatively, the LWIR wavelength cutoff of the chalcogenide hybrid organic/inorganic polymers of the present invention is increased by at least about 5%, typically at least about 10%, often at least about 15%, and more often at least about 20% compared to the same or similar polymers in the absence of any chalcogenide. It should be appreciated that as discussed above, the transparency depends on the particular wavelength being used.

Chalcogenides have high IR transparency both in the mid-IR wavelength and LWIR wavelength regions. Accordingly, the more chalcogenide is present in the chalcogenide hybrid organic/inorganic polymer of the present invention, the higher the IR transparency. In contrast, the unsaturated bonds and aromatic (including heteroaromatic) ring systems are highly opaque in the LWIR wavelength region. Therefore, to reduce opacity in the IR region, chalcogenide hybrid organic/inorganic polymers of the invention do not include aromatic ring systems. Polymers made of non-cyclic alkyl groups also have a significant opacity in mid-IR and/or LWIR regions.

Chalcogenide hybrid organic/inorganic polymers of the invention overcomes these problems. In particular, chalcogenide hybrid organic/inorganic polymers of the invention comprise a plurality of non-aromatic hydrocarbon cyclic ring structure attached to a chalcogenide. In. this manner, a relatively high mid-IR and/or LWIR wavelength transparency is achieved. The term "hydrocarbon cyclic ring structure" refers to a mono-, di-, tri-, tetra- or higher carbon ring systems present in the structure. Exemplary monocyclic hydrocarbon ring structures include, but are not limited to, cyclopropane, cyclobutane, cyclopentane, cyclohexane, cycloheptane, cyclooctane, cyclononane, cyclodecane, cycloundecane, cyclododecane, etc. Exemplary bicyclic hydrocarbon ring structures include, but are not limited to, bicyclo[2.2.1]heptane or norbornane, cyclo[3.3.0]octane or octahydropentalene, decahydronaphthalene, bicyclo[2.2.2] octane, etc. In some embodiments, substantially all (i.e., at least about 95%, typically at least about 98%, often at least 99%, more often at least about 99.5%, and most often at least about 99.9% of the total hydrocarbon system) of the hydrocarbons in chalcogenide hybrid organic/inorganic polymers of the invention are part of a cyclic ring structure system.

In some embodiments, the carbon atom that is part of the ring structure can also include a functional group. Exemplary functional groups that can be present in the carbon atom ring structure include, but are not limited to, a carbonyl (=O), an ester (—C(=O)—OR$^a$, where R$^a$ is C$_{1-12}$ alkyl), cyano (—CN), nitro (—NO$_2$), halide (e.g., chloro, fluoro, bromo, and iodo), an amide (—C(=O)—NR$^b$R$^c$, where each of R$^b$ and R$^c$ is independently H or C$_{1-12}$ alkyl), a sulfoxide (—SO$_2$—), a sulfone (—SO—), a thioether (—S—), and an ether (—O—).

The non-aromatic hydrocarbon ring system can be derived using any of the reactions known to those skilled in organic chemistry. In some embodiments, the hydrocarbon ring system is produced from a [4+2] and/or [2+2] cycloaddition reaction. Such reactions are well-known to one skilled in the art. For example, some [4+2] cycloadditions are known as Diels-Alder reactions or [4+2] sigmatropic rearrangement reactions. Yet in some embodiments, at least one of the non-aromatic hydrocarbon cyclic ring structure is derived from a cycloaddition reaction of a starting material comprising cyclopentadiene, norbornadiene, benzoquinone, a cyclooctadiene, a cyclooctatriene, cyclooctatetraene, dicyclopentadiene or other C$_{6-20}$ cycloalkenes having two or more carbon-carbon unsaturated bonds. The [4+2] cycloaddition and [2+2] cycloaddition is schematically represented in Scheme I below:

SCHEME I

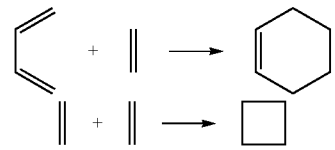

To prepare a chalcogenide hybrid organic/inorganic polymer of the invention, a polymeric hydrocarbon ring structure comprising an unsaturated bond is reacted with a chalcogenide, such as sulfur, selenium, a cyclic selenium sulfide, or a combination thereof. This allows formation of bonds between the unsaturated bonds that are present in the hydrocarbon ring structure and the chalcogenide.

One particular representative reaction for producing chalcogenide hybrid organic/inorganic polymer of the invention is illustrated in Scheme II below:

Scheme II

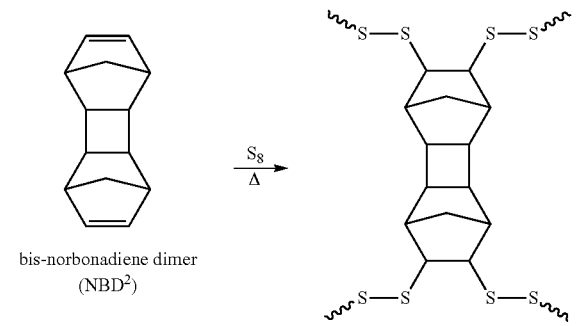

bis-norbornadiene dimer (NBD$^2$)

The starting material bis-norbornadiene dimer ("NBD$_2$") can be readily prepared from norbornadiene as shown in Scheme III below.

Scheme III

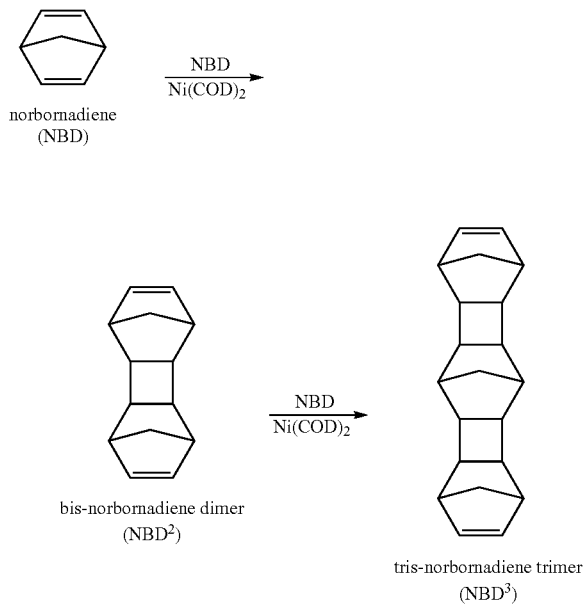

bis-norbornadiene dimer (NBD²)

tris-norbornadiene trimer (NBD³)

It should be noted that in some instances, tris-norbornadiene trimer ("NBD³") is also produced in addition to the NBD². The amount of NBD³ can be reduced by purifying NBD² (e.g., by sublimation or any other methods known to one skilled in the art, such as recrystallization, chromatography, etc.) prior to reaction with a chalcogenide.

Other cyclic starting materials and some of the methods for producing the same are shown in below:

I. Examples of Other Suitable Starting Materials:

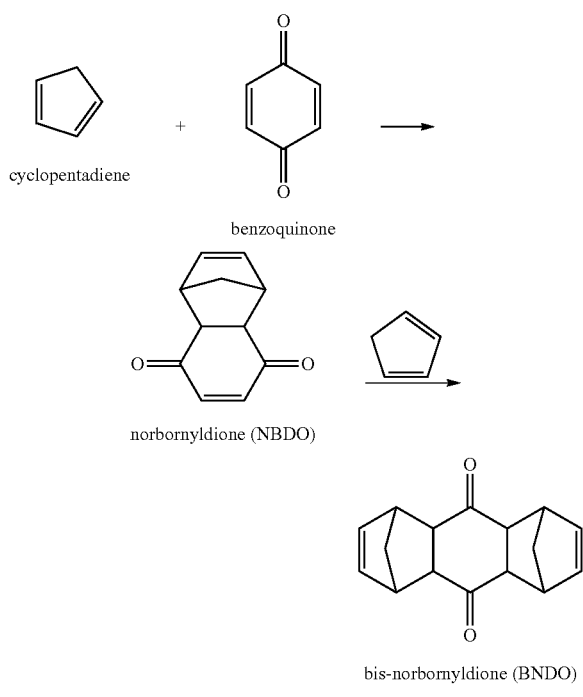

2. Examples for Preparing Other Starting Materials:

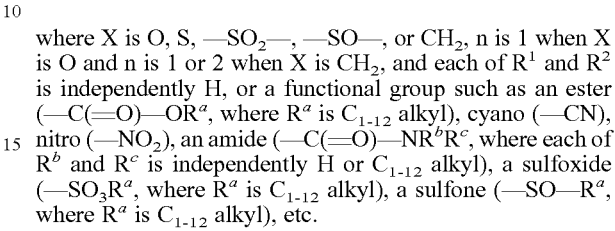

where X is O, S, —$SO_2$—, —SO—, or $CH_2$, n is 1 when X is O and n is 1 or 2 when X is $CH_2$, and each of $R^1$ and $R^2$ is independently H, or a functional group such as an ester (—C(=O)—$OR^a$, where $R^a$ is $C_{1-12}$ alkyl), cyano (—CN), nitro (—$NO_2$), an amide (—C(=O)—$NR^bR^c$, where each of $R^b$ and $R^c$ is independently H or $C_{1-12}$ alkyl), a sulfoxide (—$SO_3R^a$, where $R^a$ is $C_{1-12}$ alkyl), a sulfone (—SO—$R^a$, where $R^a$ is $C_{1-12}$ alkyl), etc.

One specific method for preparing a substituted non-aromatic hydrocarbon cyclic compound, e.g., norbornadiene ester, that can be used in methods for preparing chalcogenide hybrid inorganic/organic polymer is shown below:

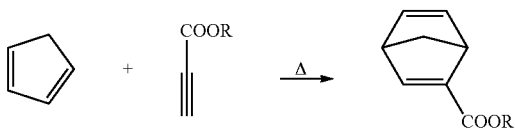

Figure 3:
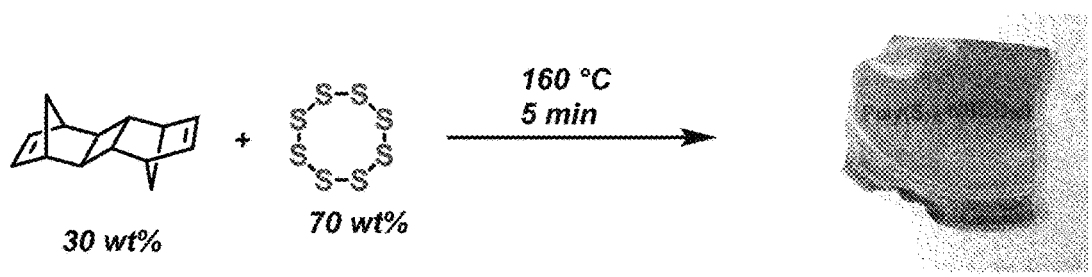
FIG. 3 shows a method for producing one particular embodiment of a chalcogenide hybrid organic/inorganic polymer of the present invention, namely, norbornadiene dimer chalcogenide polymer (e.g., 70 wt % S, 30 wt % norbornadiene).
Figure 4:
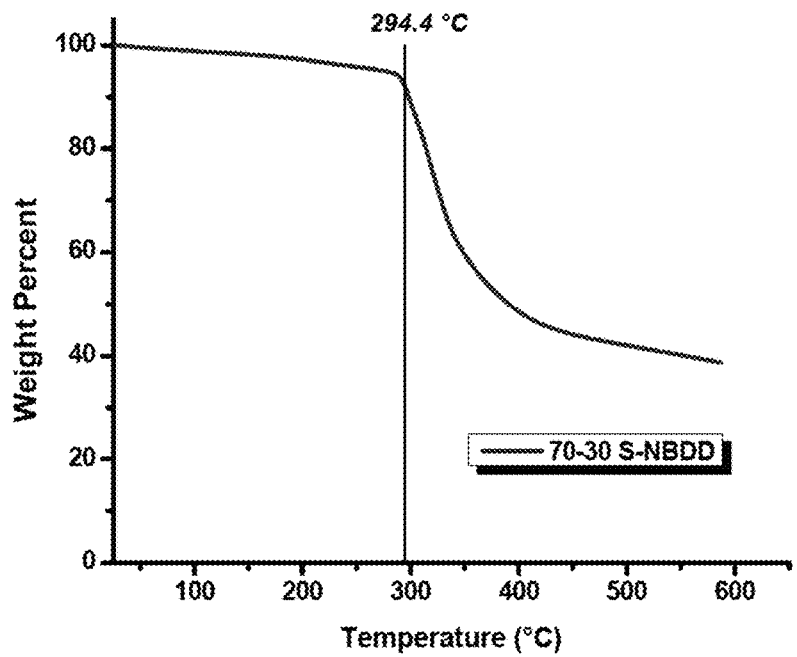
FIG. 4 is a thermal stability graph of one embodiment of the chalcogenide polymeric material comprised of 70 wt % sulfur and 30 wt % norbornadiene dimer (NBDD).

The non-aromatic hydrocarbon cyclic compound used in preparing CHIPs of the invention includes an unsaturated carbon-carbon bond (e.g., double or a triple bond). This unsaturated bond is used to attach chalcogenide and produce the chalcogenide hybrid organic/inorganic polymers of the invention. For example, see FIG. 3. While chalcogenide polymers produced from heteroaromatic moieties as provided in the commonly assigned U.S. provisional patent application No. 62/740,392, which is incorporated herein by reference in its entirety, has a relatively good thermal stability, it was found that chalcogenide hybrid organic/inorganic polymers of the present invention have a significantly higher thermal stability. See FIG. 4. In some embodiments, the thermal stability of chalcogenide hybrid organic/inorganic polymers of the invention is at least about 200° C., typically at least about 220° C., often at least about 225° C., and more often at least about 250° C. The thermal stability of chalcogenide hybrid organic/inorganic polymers can be readily determined by one skilled in the art using the procedures described herein as well as in the Examples section below. Briefly, the thermal stability of sulfur copolymers such NBD2 was investigated by thermogravimetric analysis using Q500 TGA (TA instruments) under nitrogen atmosphere by measuring weight loss of the material as a function of increasing temperature from T=0 to 600° C. The point of rapid weight loss (see, for example, FIG. 4 at 294.4° C.) is considered to be the thermal stability temperature.

An optical lens can be prepared from chalcogenide hybrid organic/inorganic polymers of the present invention using any of the methods known to one skilled in the art for fabricating an optical lens from a polymer. While any of the chalcogenides described herein (e.g., sulfur, selenium, a cyclic selenium sulfide or a combination thereof) can be used, the following example illustrates a process for producing an IR lens using sulfur as a chalcogenide. The process generally includes:

a. preparing a lens mold;
b. providing elemental sulfur;

c. heating the chalcogenide to form a molten sulfur;

d. mixing one or more comonomers or an organic compound with the molten sulfur, wherein the one or more monomers is selected from a group consisting of amine monomers, thiol monomers, sulfide monomers, alkynyl monomers, epoxide monomers, nitrone monomers, aldehyde monomers, ketone monomers, thiirane monomers, and ethylenically unsaturated monomers, wherein the one or more comonomers polymerizes with the molten sulfur to form an optical sulfur copolymer;

e. pouring the optical sulfur copolymer into the lens mold to form a molded optical sulfur copolymer;

f. curing the molded optical sulfur copolymer to vitrify the molded optical sulfur copolymer into the optical polymer lens; and g. removing the optical polymer lens from the lens mold;

wherein the optical polymer lens has a refractive index between 1.7 and 2, wherein the optical polymer lens is substantially transparent in the infrared or visible spectrum. The comonomer or the organic compound comprises s non-aromatic hydrocarbon cyclic ring structure, and the resulting optical polymer contains no carbon-carbon unsaturated bonds. If such carbon-carbon unsaturated bonds are present, these are unreacted carbon-carbon unsaturated bonds and accounts for no more than about 5%, typically no more than about 3%, often no more than 1%, and more often no more than 0.1% of the unsaturated carbon-carbon bonds in the starting comonomer or organic compound.

The lens mold can be prepared by:

a. mixing an elastomeric base with a curing agent to form a replica mixture;

b. pouring the replica mixture over a master lens to form the lens mold;

c. placing the lens mold under reduced pressure to remove bubbles in the lens mold;

d. curing the lens mold; and e. removing the lens mold from the master lens.

Alternatively, diamond turning fabrication method can be used to produce various optical elements from CHIPs of the present invention. Diamond turning fabrication method is well known to one skilled in the art for manufacturing optical surfaces. Briefly, diamond turning fabrication involves using a machine tool with, typically, a single-crystal diamond-cutting tool to produce the desired optics. See, for example, nist.gov/publications/fabrication-optics-diamond-turning; and en.wikipedia.org/wiki/Diamond_turning, which are incorporated herein by reference in their entirety.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Synthesis of Norbornadiene Dimer (NBD2):

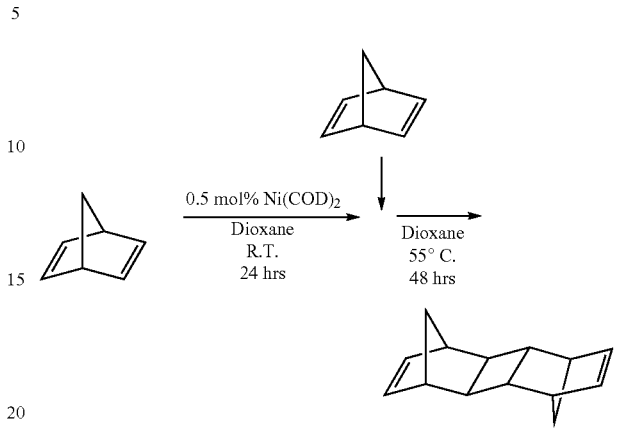

A 25 mL Schlenk flask equipped with a magnetic stir bar was flame dried under vacuum then cooled under a flow of argon gas. 2,5-norbornadiene (5 mL, 49.6 mmol) and dioxane (5.4 mL) were added to the sealed Schlenk flask and argon was bubbled through the solution, with stirring for 15 minutes. Under a strong flow of argon, Ni(COD)$_2$ complex (69.5 mg, 0.25 mmol) was added quickly and then the Schlenk flask was again sealed and placed under an argon atmosphere (the argon inlet was removed after stirring for 1-2 hours at room temp, but remained sealed). Over the course of this 1-2 hours, the solution initially became yellow as the Ni complex dissolved, followed by the slow in-growth of a deep, vibrant red color that gave way to an orange solution with a white precipitate after stirring overnight at room temperature. After 24 hours, a second aliquot of 2,5-norbornadiene (5 mL, 49.6 mmol) was degassed by bubbling argon through the liquid and transferred to the reaction flask via purged syringe. Once added, the reaction mixture was placed in a 55° C. oil bath and stirred for a further 48 hours. During this time the solution became grey/brown with more white precipitate forming in the reaction flask. After 48 hours, the reaction mixture was cooled to room temperature, diluted with THF (5-10 mL) and precipitated by the addition of methanol (~25 mL). The resulting mixture was then concentrated under reduced pressure to yield a tan/grey, completely dry solid that was transferred to a large sublimator. After evacuation of the sublimator for ~30 minutes, the apparatus was placed in a 90-95° C. oil bath for four hours. The cold finger was washed with DCM into a beaker to remove the sublimed product, dried with magnesium sulfate to remove condensed moisture from the atmosphere then concentrated under reduced pressure to yield a waxy solid that was dried completely on a high vacuum line to afford white crystals.

Synthesis of Poly(S$_x$-r-NBD2$_y$) via Inverse Vulcanization:

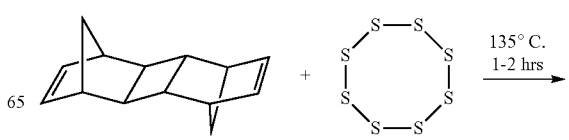

-continued

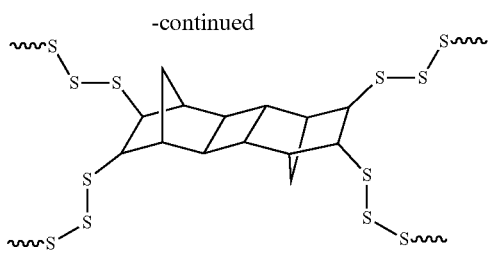

70 wt % Sulfur composition (i.e. Poly($S_{70}$-r-$NBD2_{30}$)): Elemental sulfur (1.4 g, 70 wt/wt %) and NBD2 (0.6 g, 30 wt/wt %) were added to a 1.5 dram vial equipped with a magnetic stir bar and roughly mixed as solids. The vial was then placed in a 135° C. oil bath wherein the mixture of solids melted and became a homogenous, yellow fluid. The mixture gradually became more viscous and adopted an orange color before vitrifying after 55 minutes; the reaction vessel was left in the oil bath for an additional 9 minutes. The vial was then removed from the oil bath and the vitrified material recovered from the vial by freezing and cracking the vial to afford a glassy, yellow orange solid.

50 wt % Sulfur composition (i.e. Poly($S_{50}$-r-$NBD2_{50}$)): Elemental sulfur (1.0 g, 50 wt/wt %) and NBD2 (1.0 g, 50 wt/wt %) were added to a 1.5 dram vial equipped with a magnetic stir bar and roughly mixed as solids. The vial was then placed in a 135° C. oil bath wherein the mixture of solids melted and became a homogenous, yellow fluid. The mixture gradually became more viscous and adopted an orange color before vitrifying after 1.75 hr; the reaction vessel was left in the oil bath for an additional 20 minutes. The vial was then removed from the oil bath and the vitrified material recovered from the vial by freezing and cracking the vial to afford a glassy, yellow orange solid.

Synthesis of Mono-Ester Substituted Norbornadiene:

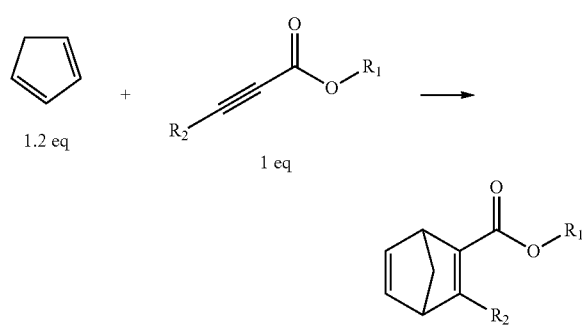

$R_1$ = Methyl
$R_1$ = tBu
$R_1$ = naphthyl
$R_1$ = Methyl
$R_2$ = H
$R_2$ = H
$R_2$ = H
$R_2$ = Methyl A 50 mL round bottom flask equipped with a magnetic bar and distillation head was flame dried under vacuum then cool under a flow of argon. 15 mL of dicyclopentadiene was injected to RBF at room temperature and ramp up to 170° C. oil bath to crack to cyclopentadiene then distilled. To 10 mL round bottom flask equipped with magnetic bar was added cyclopentadiene (1 mL, 19.2 mmol, 1.2 eqiv) in toluene (1 mL). The alkyne (1.0 equiv. 12.8 mmol) was added. The solution was merged to 40° C. oil bath and stirred for 24 hours. after cooling down to room temperature, toluene was removed under rotary evaporation. The crude mixture was purified by column chromatography using hexanes and ethyl acetate (3:1) mixture as an eluent.

Synthesis of Norbornadiene Diesters:

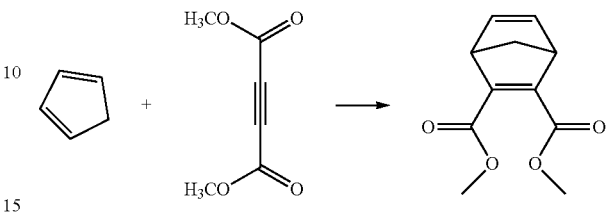

Freshly distilled (cracked) cyclopentadiene (3 mL) was added to a 10 mL RBF with THF (3 mL) and dimethyl acetylenedicarboxylate (3.5 mL). A stir bar was then added, and the flask was lowered into an oil bath set to 40° C. for 24 hours. After allowing the flask to cool, the contents were concentrated by rotary evaporation. The product was then purified by column chromatography (HEX:EA, 3:1).

Inverse Vulcanization of Ester Substituted Norbornadiene Derivates, p(S-r-ESNBD)

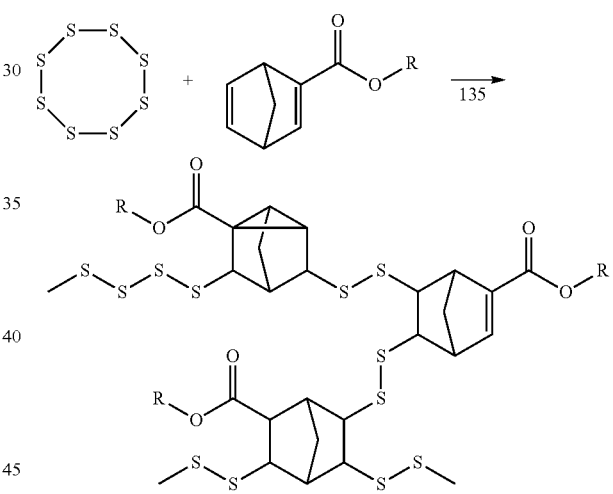

70 wt % Sulfur composition (i.e. Poly(S70-r-$ESNBD_{30}$)): To 1.5 dram vial equipped with a magnetic stir bar the elemental sulfur (0.7 g, 70 wt/wt %) was heated up 135° C. Once elemental sulfur changed to clear orange colored liquid phase, the ester substituted norbornadiene (ESBND 0.3 g, 30 wt/wt %) was added dropwise. With the methyl ester substituted, tert butyl substituted, dimethyl ester substituted norbornadiene showed too fast reaction to make homogeneous phase. In contrast to other monomer, naphthyl ester substituted norbornadiene showed homogeneous phase and vitrified in 10 mins. The vial was then removed from the oil bath and the vitrified material recovered from the vial by freezing and cracking the vial to afford a glassy, yellow orange solid.

General Procedure for Diamond Turning to Fabricate Microlens Arrays: There are two primary methods known in the art to diamond-turn a microlens array. The first way is to directly cut the lenses. In this mode, the motion along the C-axis (machine spindle on which the workpiece is mounted) is synchronized to the X-Z axes' motion. The prescription is to input to appropriate 3D software instructions to the diamond turning control system, along with certain parameters like the tool radius. The software calculates a spiral toolpath (constant rotation of C and constant translation in X) which modulates the Z position based on the lenslet surfaces, the tool radius, and the tool's position above the workpiece. The toolpath is transferred to the diamond-turning machine, the workpiece is centered on the spindle's vacuum chuck, and the Z offset is adjusted by touching-off the tool on the part surface. Such a cut can take several hours to complete depending on the size of the part. A challenge of this method is that a convex tool is often being used to cut a convex shape, so the tool's radius of curvature determines the smallest radius curvature that can be cut.

In another technique, the molding technique, a concave mold is cut using basically the same method as with direct turning. However, in this case the lens surface negatives are concave and the tool is convex, so as long as the tool is smaller than the lens radius, so the surface can be cut without any softening to the pits or canyons between each lens element. In addition, lens element negatives can be cut in an alternating pattern to eliminate the need for any sharp transition in motion. Once all of the lens element patterns are cut, the lenses can be molded. A PMMA (or other moldable plastic) blank is inserted between the array mold face and a flat mold face, aligned by a spacer ring. The assembly is heated and the plastic pressed as needed, checked for form accuracy, fill factor, and thickness, and the mold or the alignment ring is then recut as needed to correct errors.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A chalcogenide hybrid organic/inorganic polymer comprising a nonaromatic hydrocarbon cyclic ring structure attached to a chalcogenide;
wherein:
the polymer is a reaction product of a non-aromatic hydrocarbon cyclic dimer with a chalcogenide;
the chalcogenide is elemental sulfur;
the non-aromatic hydrocarbon cyclic dimer comprises a bicyclo[2.2.1] heptadiene dimer or a bicyclo[2.2.2] octadiene dimer; and
the chalcogenide hybrid organic/inorganic polymer is glassy and substantially transparent in the visible and infrared spectrum.

2. The chalcogenide hybrid organic/inorganic polymer of claim 1, wherein the chalcogenide hybrid organic/inorganic polymer has a refractive index of at least about 1.78 in the long wave infrared (LWIR) region ranging from about 8 µm to about 12 µm wavelength ($\lambda$).

3. The chalcogenide hybrid organic/inorganic polymer of claim 1, wherein the total amount of chalcogenide in the polymer ranges from about 5 wt % to about 95 wt %.

4. The chalcogenide hybrid organic/inorganic polymer of claim 1, wherein the chalcogenide hybrid organic/inorganic polymer has a refractive index-of at least about 1.70 in the long wave infrared (LWIR) region ranging from about 8 µm to about 12 µm wavelength ($\lambda$).

5. The chalcogenide hybrid organic/inorganic polymer of claim 1, wherein the chalcogenide hybrid organic/inorganic polymer is thermally stable at a temperature of at least about 220° C.

6. The chalcogenide hybrid organic/inorganic polymer of claim 1, wherein the chalcogenide hybrid organic/inorganic polymer has a refractive index of at least about 1.65 in the long wave infrared (LWIR) region ranging from about 8 µm to about 12 µm wavelength ($\lambda$).

7. A method for producing a chalcogenide hybrid organic/inorganic polymer, the method comprising:
reacting a non-aromatic organic compound with a chalcogenide to produce said chalcogenide hybrid organic/inorganic polymer;
wherein:
the non-aromatic organic compound is bicyclo[2.2.1] heptadiene dimer or bicyclo[2.2.2] octadiene dimer;
the chalcogenide is elemental sulfur;
the amount of chalcogenide present in the chalcogenide hybrid organic/inorganic polymer is at least about 5 wt %; and
the chalcogenide hybrid organic/inorganic polymer is glassy and substantially transparent in the visible and infrared spectrum.

8. The method of claim 7, wherein the amount of chalcogenide present in the chalcogenide hybrid organic/inorganic polymer is from about 5 wt % to about 95 wt %.

9. The method of claim 7, wherein the organic compound has no conjugated carbon-carbon unsaturated bonds.

10. The method of claim 7, wherein the chalcogenide hybrid organic/inorganic polymer has a refractive index of at least about 1.65 in the long wave infrared (LWIR) region ranging from about 8 µm to about 12 µm wavelength ($\lambda$).

11. An infrared (IR) imaging or sensing device comprising the chalcogenide hybrid organic/inorganic polymer of claim 1.

12. The IR imaging or sensing device of claim 11, wherein the IR imaging or sensing device is adapted to image or sense in the long wave infrared (LWIR) region ranging from about 8 µm to about 12 µm wavelength ($\lambda$).

13. The IR imaging or sensing device of claim 11, wherein the chalcogenide hybrid organic/inorganic polymer has a refractive index of at least about 1.65 in the long wave infrared (LWIR) region ranging from about 8 µm to about 12 µm wavelength ($\lambda$).

14. An optical device comprising the chalcogenide hybrid organic/inorganic polymer of claim 1 and having a refractive index of at least about 1.65 in the long wave infrared (LWIR) region ranging from about 8 µm to about 12 µm wavelength ($\lambda$).

15. The optical device of claim 14, wherein the optical device is an optical polymer lens.

16. The optical device of claim 14, wherein the chalcogenide hybrid organic/inorganic polymer has a refractive index at least about 1.70.

17. The optical device of claim 14, wherein the chalcogenide hybrid organic/inorganic polymer has a refractive index from about 1.7 to about 2.

* * * * *